US006996156B1

(12) United States Patent
Ono

(10) Patent No.: US 6,996,156 B1
(45) Date of Patent: Feb. 7, 2006

(54) CDMA RECEIVER CAPABLE OF ESTIMATION OF FREQUENCY OFFSET IN HIGH PRECISION

(75) Inventor: Shigeru Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 955 days.

(21) Appl. No.: 09/604,930

(22) Filed: Jun. 28, 2000

(30) Foreign Application Priority Data

Jun. 29, 1999 (JP) ................................ 11/184099

(51) Int. Cl.
*H04B 1/707* (2006.01)

(52) U.S. Cl. .................... 375/147; 375/344; 455/192.1

(58) Field of Classification Search ................ 375/130, 375/140–150, 316, 346, 344, 365, 326, 306; 370/314, 335, 342, 208, 320; 455/192.1
See application file for complete search history.

(56) References Cited

U.S. PATENT DOCUMENTS

| | | | | |
|---|---|---|---|---|
| 5,550,811 A * | 8/1996 | Kaku et al. | ................. | 370/342 |
| 5,734,639 A | 3/1998 | Bustamante et al. | | |
| 5,805,648 A | 9/1998 | Sutton | | |
| 5,818,882 A * | 10/1998 | Komatsu | .................... | 375/344 |
| 5,982,763 A * | 11/1999 | Sato | ........................... | 370/342 |
| 6,266,361 B1 * | 7/2001 | Huang et al. | ............... | 375/140 |
| 6,590,872 B1 * | 7/2003 | Shiue et al. | ................ | 370/314 |

FOREIGN PATENT DOCUMENTS

| | | |
|---|---|---|
| EP | 0749213 A3 | 12/1996 |
| EP | 0810743 | 12/1997 |
| EP | 0749213 A2 | 11/1999 |
| JP | 5-207088 | 8/1993 |
| JP | 7-202964 | 8/1995 |
| JP | 8-130565 | 5/1996 |

(Continued)

OTHER PUBLICATIONS

U.K. Search Report issued Jan. 22, 2001 in a related application (in English).

(Continued)

*Primary Examiner*—Young T. Tse
*Assistant Examiner*—Edith Chang
(74) *Attorney, Agent, or Firm*—Dickstein, Shapiro, Morin & Oshinsky, LLP.

(57) ABSTRACT

A receiver for a code division multiple access system includes a pilot symbol producing section, a frequency offset estimating section and a local signal generating section. The pilot symbol producing section produces pilot symbols of complex vector expression from a received radio frequency (RF) signal based on a first local frequency signal and a second local frequency signal. The first local frequency signal has a frequency obtained by shifting a frequency of a carrier signal by an IF frequency and the second local frequency signal has a frequency equal to the IF frequency. The pilot symbols have been subjected to inverse modulation to remove a modulation component. The frequency offset estimating section carries out in-phase adding operations to the pilot symbols of the complex vector expression over a predetermined interval in accordance with a predetermined pattern. Then, the frequency offset estimating section carries out a complex adding operation of results of the in-phase adding operations, and determines a frequency offset from a result of the complex adding operation. The local signal generating section generates the first and second frequency signals based on the determined frequency offset.

7 Claims, 8 Drawing Sheets

FOREIGN PATENT DOCUMENTS

| | | |
|---|---|---|
| JP | 8-213933 | 8/1996 |
| JP | 9-93302 | 4/1997 |
| JP | 2705613 | 10/1997 |
| JP | 10-32523 | 2/1998 |
| JP | 2771757 | 4/1998 |
| JP | 10 -126310 | 5/1998 |
| JP | 11-41141 | 2/1999 |
| JP | 11-68698 | 3/1999 |
| WO | 99/59259 | 11/1999 |

OTHER PUBLICATIONS

Japanese Office Action issued Dec. 6, 2002 (w/ English translation of relevant part).

Japanese Office Action issued Feb. 26, 2003 (w/ English translation of relevant part).

Japanese Office Action issued Sep. 9, 2002 (w/ English translation).

* cited by examiner

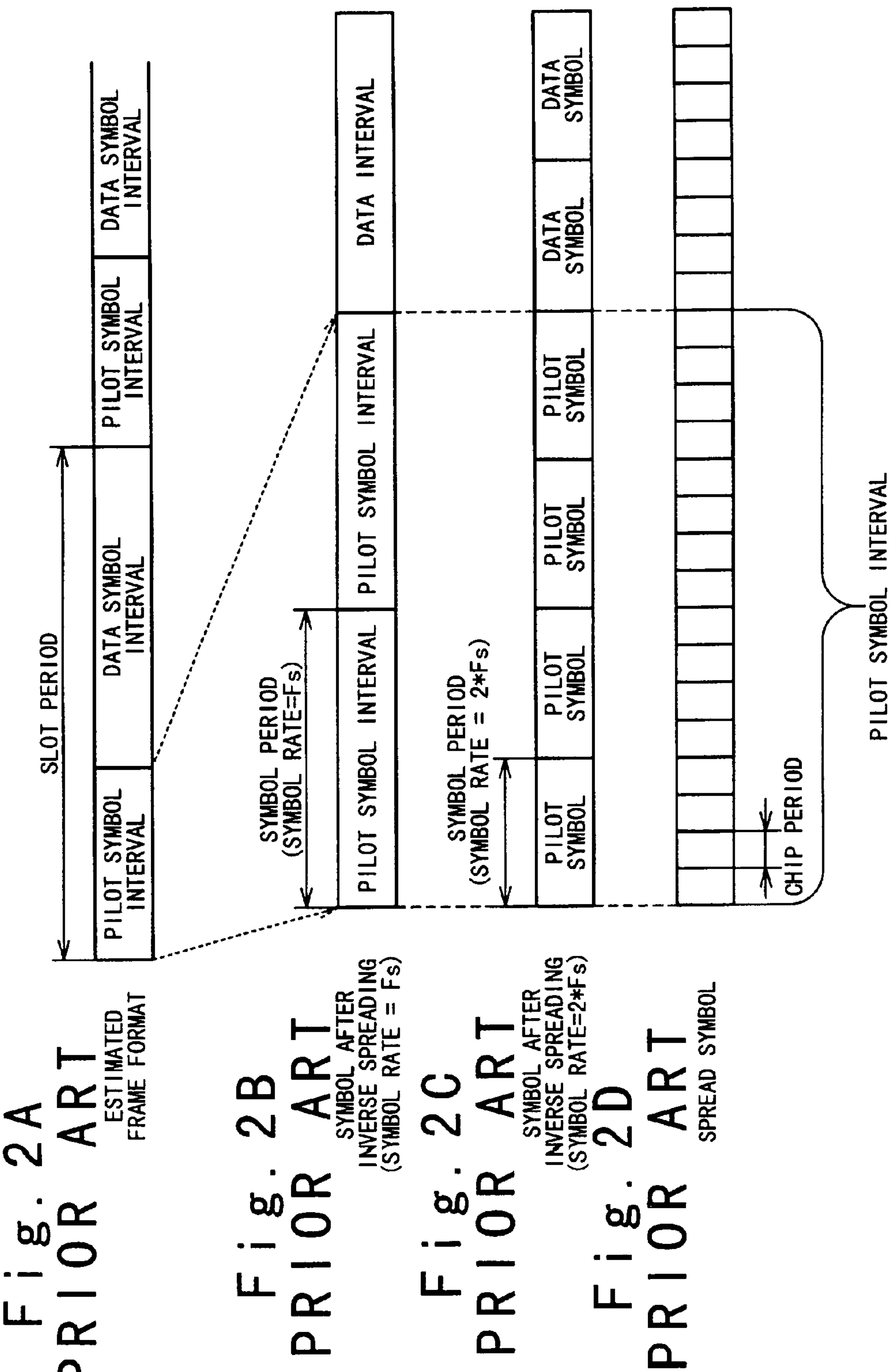
Fig. 2A PRIOR ART ESTIMATED FRAME FORMAT
Fig. 2B PRIOR ART SYMBOL AFTER INVERSE SPREADING (SYMBOL RATE = Fs)
Fig. 2C PRIOR ART SYMBOL AFTER INVERSE SPREADING (SYMBOL RATE=2*Fs)
Fig. 2D PRIOR ART SPREAD SYMBOL

CDMA RECEIVER CAPABLE OF ESTIMATION OF FREQUENCY OFFSET IN HIGH PRECISION

BACKGROUND OF THE INVENTION

1. Field of the Invention

The present invention relates to a receiver in a code division multiple access (to be referred to a CDMA system, hereinafter) system, and more particularly, to a technique for frequency offset estimation used in a spectrum spreading technique.

2. Description of the Related Art

In a code division multiple access (CDMA) system using a spectrum spreading process, data symbols to be transmitted are spread in accordance with a spreading code having a rate higher than a symbol rate. Channels to be multiplexed have different spreading codes and their symbol rates are varied depending on a data rate in transmission. To realize a variable symbol rate without changing a chip rate, a spreading code length per symbol (to be referred to as a spreading rate, hereinafter) shall be controlled. It should be noted that the symbol is a unit for data modulation before the spectrum spreading process is carried out. When the data modulation system is QPSK, one symbol represents a combination of one bit of an in-phase component and one bit of an orthogonal component. That is, the symbol can be expressed by a complex number.

For receiving a spectrum spread signal at high accuracy, it is essential to carry out synchronization detection. For this purpose, it is necessary at a receiver that the frequency of a local signal applied for down-converting an RF (radio frequency) signal to a baseband signal is equivalent to the frequency of a carrier signal from a transmitter. If there is a discrepancy in frequency, i.e., a frequency offset between the local signal at the receiver and the carrier signal at the transmitter, the frequency offset appears on the baseband signal. The frequency offset will cause a timing error in the baseband signal processing or degradation of the S/N ratio after inverse spreading of spectrum, resulting in degrading the quality of a received signal. Particularly, in the CDMA system, the inverse spreading of spectrum of the received signal can not be correctly carried out due to the discrepancy for one chip. Degradation of the S/N ratio after the inverse spreading of spectrum may lead to deterioration of the anti-interference property. Therefore, the development of a higher accuracy automatic frequency controlling system has been desired.

For example, according to a synchronization establishing process of the IMT-2000 technology recommended for international mobile telecommunications, scramble codes on a perch channel are divided to a limited number of groups. For quick acquisition of a cell, the scramble code having a long period is transferred on the channel and a short search code is inserted for every time slot. Orthogonal gold codes are used as the search codes, which are classified into two types, a primary search code and a secondary search code. These search codes are transferred in parallel. The primary search code is a unique code in the system while a plurality of codes are transmitted in a sequence as the secondary code. A mobile terminal receives the primary search code peculiar to the terminal to establish the symbol synchronization and the slot synchronization. In this case, it is desired that the synchronization with the primary search code can be quickly established, and the synchronization with the perch channel can be established. Thus, the cell can be quickly acquired through grouping on the basis of on the scramble code.

FIG. 1 is a block diagram of a conventional automatic frequency controlling apparatus. FIG. 1 shows not the entire structure of a receiver but a relevant section of an automatic frequency controlling process. Also, for simplification of the description, inversely spreading units are limited to two units and such a conventional automatic frequency controlling apparatus is then illustrated.

Referring to FIG. 1, an RF (radio frequency) signal, i.e., a high frequency signal from a transmitter received by an antenna is introduced to a frequency converter 201 via an input terminal 100. The frequency converter 201 receives a first local frequency signal from the first local frequency generator 202. A first local frequency signal is obtained by offsetting the frequency of a carrier signal from the transmitter by an IF frequency. The frequency converter 201 converts the RF signal into an IF (intermediate frequency) signal in accordance with the first local frequency signal. The IF signal is then adjusted to a predetermined signal level by an AGC unit 101 and transferred to an orthogonal demodulator 210. A second local frequency signal having an IF frequency is supplied from a second local frequency generator 203 to an orthogonal demodulator 210. In response to the second local frequency signal, the orthogonal demodulator 210 converts the IF signal into a baseband signal which has a component along an in-phase axis and a component along an orthogonal axis. It is now assumed that QPSK modulation is employed. The in-phase component and the orthogonal component of the orthogonally demodulated signal are passed through two LPF units 102, respectively, and fed to A/D converters 103 which converts into their digital signals. Then, the converted digital signals are transferred to inversely spreading units 220 and a path searching unit 260.

The path searching unit 260 determines a delay profile from the digital signals supplied from the A/D converters 103 to determine the timing for inverse spreading used in the inversely spreading units 220. The intervals for which the delay profile is calculated and the averaged length of the intervals are determined based on an instruction 301 from the controller 300. The path searching unit 260 outputs an inverse spreading timing to the inversely spreading units 220 based on the determined delay profile. Also, the path searching unit 260 determines how many effective multi-paths are present in the received digital signals and delivers its result 303 to the controller 300.

The inversely spreading units 220 receive a control signal 301 from the controller 300. The control signal 301 includes parameter data 301 such as a spreading code and symbol rate of the channel and boundary data of a pilot symbol interval. The inversely spreading units 220 inversely spread the digital signals received from the A/D converters 103 into symbol signals based on the inverse spreading timing received from the path searching unit 260 and the control signal 301. The symbol signals are transferred to pilot symbol inverse demodulators 230. In this conventional example, it is assumed that a pilot symbol signal and a data symbol signal are time-multiplexed in the symbol signal to have a QPSK transmission format, as illustrated in FIG. 2A.

A pilot symbol interval is inserted before a data symbol interval for every slot period having a predetermined interval called "a slot". A pilot symbol pattern in the pilot symbol interval in each slot period is variable. In this case, the symbol rate can be made variable by changing the spreading rate under a constant chip rate as shown in FIG. 2D. More specifically, the symbol interval in the symbol rate of 2*Fs is decreased to a half of the symbol interval in the symbol rate of Fs, as shown in FIGS. 2B and 2C.

It should be noted that the pilot symbol interval remains unchanged in the length when the symbol rate is varied in FIGS. 2B and 2C. However, there generally is no such a limitation. The pilot symbol interval length may be varied depending on the symbol rate and is not the limitation essential to the present invention.

The controller 300 shown in FIG. 1 receives the number of effective paths 303 from the path searching unit 260. The controller 300 generates a reception channel data such as the spreading code, the symbol rate, and the number of pilot symbols or pilot symbol interval. Also, the controller 300 generates various parameters for frequency offset estimation such as the number of data for phase difference average summation and angle/frequency offset conversion factors. In addition, the controller 300 generates temperature compensated crystal oscillator (TCXO) control data such as a conversion table between frequency offset and TCXO control voltage and the validation or invalidation of an updating operation of frequency offset. The controller 300 supplies the reception channel data as the control signal 301 to the path searching unit 260, the inverse spreading units 220, the pilot symbol inverse modulators 230 and a frequency offset estimator 250. Also, the controller 300 supplies the parameters for frequency offset estimation and a part of the TCXO control data such as the validation or invalidation of the updating operation of frequency offset to the frequency offset estimator 250 as the control signal 301 in addition to the reception channel data. Also, the controller 300 supplies the conversion table between frequency offset and TCXO control voltage to a TCXO controller 270 as the control signal 302.

FIG. 3A is a block diagram of the pilot symbol inverse demodulator 230. In the pilot symbol inverse demodulator 230, a controller 239 generates a generation control signal to the reference pilot symbol generator 232 in response to the control signal 301 from the controller 300. The reference pilot symbol generator 232 generates a pilot symbol pattern for a symbol rate and a concerned slot in response to the generation control signal to output to a pilot symbol inverse demodulator 233. The pilot symbol pattern for the symbol rate and the concerned slot necessary for the inverse demodulation. Thus, the length of the pilot symbol interval is determined based on the control signal 301. The QPSK symbol signal received from the inversely spreading unit 220 is separated by a pilot symbol interval detector 231 into pilot symbols in the pilot symbol interval and data symbols in the data symbol interval based on a control signal form the controller 239. The pilot symbols are delivered to a pilot symbol inverse demodulator 233. The data symbol is subjected to synchronization detection. The pilot symbol inverse demodulator 233 receives the pilot symbol pattern from the reference pilot symbol generator 232 and cancels a modulated component of the pilot symbol signal received from the pilot symbol interval detector 231 to produce an inversely modulated pilot symbol signal. The inversely demodulated pilot symbol signals are then transferred to an addition synthesizer 240 symbol by symbol. The inversely demodulated pilot symbol signals are outputted to the addition synthesizer 240 in the form of a complex vector.

The addition synthesizer 240 complex adds the inversely modulated pilot symbol signals supplied from the two pilot symbol demodulators 230 by a complex adder 251 and outputs the result of the complex addition to the frequency offset estimator 250. The output of the addition synthesizer 240 is expressed as complex vectors.

An example of the inverse demodulation is illustrated in FIGS. 4A and 4B. FIG. 4A shows an example of four pilot symbols received. FIG. 4B illustrates a result of removal or cancellation (or inverse demodulation) of the modulated component of each pilot symbol. When the modulated component of the pilot symbol has been removed, a fluctuation of the transmission path and a frequency offset are obtained at a point after the inverse demodulation.

As shown in FIG. 3B, in the frequency offset estimator 250, a one-symbol delay unit 251 delays the complex vector by one symbol. A complex conjugate multiplier 252 carries out complex conjugate multiplication of a complex vector outputted from the addition synthesizer 240 and the delayed complex vectors outputted from the one-symbol delay unit 251 to calculate a phase difference vector.

Next, based on the control signal 301 from the controller 300, the controller 259 supplies the number of vectors to be averaged and the execution or stop of the averaging operation to the averaging unit 253 and the symbol rate and the execution or stop of the output of the frequency offset expression to the angle/frequency offset converter 255.

The phase difference vectors are then averaged by an averaging unit 253 based on the number of vectors which is designated from a controller 259 which operates based on the control signal 301. It should be noted that the averaging operation by the averaging unit 253 may be a simple summing average, a moving average, or a leak-factor based average. If the path searching unit 260 fails to find an effective path, the averaging operation is not carried out. It is determined based on the designation from the controller 259 which of the averaging operations is carried out or whether the averaging operation is carried out or not.

Next, the phase difference vector averaged by the averaging unit 253 is then converted by an angular converter 254 from the phase difference vector expression to an angular expression. The conversion from the phase difference vector expression to the angular expression can be implemented through arc tangent conversion (arch tan (imaginary part/real part)) using an imaginary part and a real part of the phase difference vector. The angular expression is then transferred to an angle/frequency offset converter 255 where the angular expression is converted to a frequency offset expression in accordance to the symbol rate of the concerned channel designated by the controller 259. The frequency offset expression is transferred to the TCXO controller 270. If no effective path is found by the path searching unit 260, the controller 300 inhibits the updating operation of the frequency offset in the frequency offset estimator 250. Also, if the path searching unit 260 fails to find an effective path, the transfer of the frequency offset expression to the TCXO controller 270 is not carried out.

The TCXO controller 270 has a function to control a voltage applied to the TCXO unit 200 in accordance with the frequency offset value supplied from the frequency offset estimator 250. More particularly, the control voltage applied to the TCXO unit 200 is determined in accordance with the frequency offset using the table designated by the controller 300. In this case, the control voltage applied to the TCXO unit 200 is selected such that the frequency offset is compensated. The control voltage determined by the TCXO controller 270 is a digital value and hence is converted to an analog value by a D/A converter 105 and transmitted via an LPF 102 to the TCXO unit 200.

The first local frequency generator 202 and the second local frequency generator 203 receive a reference local frequency signal from the TCXO 200 with a temperature compensating circuit. The first local frequency generator 202 generates the first local frequency signal which is generated by shifting the frequency of the carrier signal received from the transmitter by the IF frequency. The second local frequency generator 203 generates the second local frequency signal which has the IF frequency.

As described above, in the conventional method, a phase difference vector between symbols is used for estimating the frequency offset. However, the S/N ratio for each symbol is degraded in the transmission frame format in which one slot period is composed of a pilot symbol interval and a data symbol interval as shown in FIG. 2A, as the symbol rate is increased. Hence, there is a problem that the accuracy of estimation of the frequency offset become worse.

More specifically, in the CDMA system in whose frame format a pilot symbol and a data symbol are time multiplexed for transmission, and a variable transmission symbol rate is realized by making the spreading rate variable under a constant chip rate, the spreading rate decreases when the symbol rate increases. As a result, the S/N gain through the spreading process decreases. Accordingly, the frequency offset has to be estimated under a lower S/N ratio condition and its estimation accuracy will be decreased.

In conjunction with the above description, a demodulating method with an adaptable phase control is disclosed in Japanese Laid Open Patent Application (JP-A-Heisei 5-207088). In this reference, a phase control circuit (28) carries out a complex weighting operation to a received complex input signal U such that a square mean of the difference between a desired signal and the complex input signal is made the smallest. A Wiener filter is formed using the phase control circuit (28). A frequency compensating circuit (44) carries out a frequency error estimation based on a variation of a correlation value between the complex input signal U and a demodulation signal D for one symbol period. A phase error estimating circuit (21) carries out an initial phase error estimation based on the frequency error estimation. A phase equalizing circuit (22) carries out a phase equalizing operation in consideration of a phase variation due to the frequency error to fully remove a stationary phase error due to a frequency offset to a correct demodulation signal D.

Also, an accumulation collective demodulator for a K-phase PSK modulated signal is disclosed in Japanese Laid Open Patent Application (JP-A-Heisei 7-202964). In this reference, a complex signal which has been subjected to a quasi-synchronization detection are sampled at a center point iT and a point (i+r)T displaced from the center point to produce (N+1) signals. The (N+1) signals are stored in memories (13 and 24). A estimating section (15) estimates an initial phase error θ'n, and a frequency error Δω' from the signals inputted to the memory (13). Local oscillators (25 and 26) generate local signals exp[−j{θ'0+(Δ'+2kπ/KT)iT}] and exp[−j{θ'0+(Δω'+2kπ/KT) (i+r)T}], respectively. Multipliers (17 and 28) complex multiply the local signals with the signals stored in the memories (13 and 24), respectively. A pattern jitter is removed from the output of the multiplier (28) by a filter (29). An estimating section (27) determines variance of distance from the output of the multiplier (17). The output of the multiplier (17) for k when the variance becomes the least is supplied to the demodulator.

Also, a prediction type synchronization detection apparatus is disclosed in Japanese Laid Open Patent Application (JP-A-Heisei 8-130565). In this reference, reception signals ys(i) which are sampled for every symbol period T are inversely modulated by means (27) into a complex symbol sequence candidates am(i) to am(i−L) (L: is a natural number and L=3 in the figure) to obtain an inverse modulation signal sequence zm(i) to zm(i−L). The inverse modulation signal sequence zm(i−1) to zm(i−L) are weighted and synthesized to produce a front prediction value. Thus, the front prediction error αfm(i) is determined to indicate the difference between the front prediction value and zm (i). The inverse modulation signal sequence zm(i) to zm(i−L+1) are weighted and synthesized to a back prediction value. Thus, a back prediction error αbm(i) is determined to indicate the difference between the back prediction value and zm(i−L). The maximum likelihood estimation is carried out by a maximum likelihood sequence estimating circuit 32 to the summation of squares of each of absolute values of αfm(i) and αbm(i) as the likelihood data and outputs am(i) to am(i−L) and a determination signal. A parameter estimating circuit (47) inputs zm(i) to zm(i−L), αfm(i), αbm(i) and estimates a weight coefficient for producing a prediction value. In this way, characteristic degradation due to a carrier frequency offset and a fading variance can be improved.

Also, a digital mobile radio communication system is disclosed in Japanese Laid Open Patent Application (JP-A-Heisei 9-93302). In this reference, two pilot symbols are provided for one frame. The phase differences between two pilot symbols are added and averaged over a plurality of frames. Thus, a compensation value of a frequency offset is determined to compensate for the frequency offset. In this way, influence due to the frequency offset between a receiver and a transmitter can be reduced in the digital mobile radio system to improve a transmission performance.

Also, a method of receiving a spectrum spread signal and a spectrum spread signal receiving apparatus are disclosed in Japanese Laid Open Patent Application (JP-A-Heisei 11-41141). In this reference, calculation of correlation between a baseband component of a spectrum spread signal and a spreading code is carried out. Then, correlation calculation is carried out at the timing which is different from a timing between the spreading code and the baseband component by ½ of a spreading code interval. The correlation calculation result at the timing which is earlier than ½ of the spreading code interval is estimated using the above calculation results. In this way, a spectrum spread signal receiving apparatus can be made smaller in size and less in power consumption without degradation of the symbol demodulation characteristic, synchronization establishment characteristic, and synchronization tracking characteristic.

Also, a frequency offset correcting apparatus is disclosed in Japanese Patent No. 2,705,613. In this reference, a receiving unit outputs a baseband signal obtained by carrying out demodulation to a reception high frequency signal. An A/D converter converts a baseband signal from the receiving unit into a digital signal. A plurality of correlation processing units carry out inverse spreading to the digital baseband signal from the A/D converter using a spreading signal which is shifted temporally, to produce correlation signals. A plurality of detectors detect the respective correlation signals from the correlation processing units. An addition synthesizer adds synthesizes the detected signals from the detectors. A frequency offset detector compares a signal part of the signal from the addition synthesizer with a theoretical signal of a known signal to detect a frequency offset value. A frequency offset correcting unit removes the frequency offset value detected by the frequency offset detector from the signal outputted from the addition synthesizer for correction.

Also, a data demodulating circuit of a receiving apparatus for a spectrum spreading communication is disclosed in Japanese Patent No. 2,771,757. This reference relates to the data demodulating circuit of the receiving apparatus for the spectrum spreading communication in which a signal which has been subjected to a spectrum spreading operation to an in-phase axis and an orthogonal axis in a direct spreading system is received using a pseudo-noise code in an in-phase axis and a pseudo-noise code in an orthogonal axis and the data is demodulated from the received signal. A receiving signal in the in-phase axis and a receiving signal in the orthogonal axis are multiplied by the pseudo-noise code in an in-phase axis and the pseudo-noise code in an orthogonal axis which correspond to a pilot signal which has been transmitted from a base station, respectively. The multiplication results are integrated. A correlation calculating unit circularly adds and averages the integration result and calculates the correlation which includes a remaining phase difference data after the detection. A phase difference compensating unit compensates for the phase differences which are contained in the received signal in the in-phase axis and the received signal in the orthogonal axis using the phase difference data supplied from the correlation calculating unit.

SUMMARY OF THE INVENTION

Therefore, an object of the present invention is to provide a receiver in a CDMA system in which a frequency offset can be estimated in a high precision.

Another object of the present invention a receiver in a CDMA system in which the S/N ratio of the complex vector can be increased.

Still another object of an automatic frequency controlling system in a CDMA system in whose frame format a pilot symbol and a data symbol are time multiplexed for transmission, and a variable transmission symbol rate is realized by making the spreading rate variable under a constant chip rate.

In order to achieve an aspect of the present invention, a receiver for a code division multiple access system includes a pilot symbol producing section, a frequency offset estimating section and a local signal generating section. The pilot symbol producing section produces pilot symbols of complex vector expression from a received radio frequency (RF) signal based on a first local frequency signal and a second local frequency signal. The first local frequency signal has a frequency obtained by shifting a frequency of a carrier signal by an IF frequency and the second local frequency signal has a frequency equal to the IF frequency. The pilot symbols have been subjected to inverse modulation to remove a modulation component. The frequency offset estimating section carries out in-phase adding operations to the pilot symbols of the complex vector expression over a predetermined interval in accordance with a predetermined pattern. Then, the frequency offset estimating section carries out a complex adding operation of results of the in-phase adding operations, and determines a frequency offset from a result of the complex adding operation. The local signal generating section generates the first and second frequency signals based on the determined frequency offset.

Here, the predetermined interval may be an interval longer than one symbol period.

Also, the pilot symbol producing section may orthogonally demodulate the RF signal into an in-phase component and an orthogonal component, and produces a channel count data indicative of a number of effective channels from the in-phase component and the orthogonal component based on a spreading code, a symbol rate and a pilot symbol interval. At this time, the receiver may further include a control unit which generates an addition count data indicative of the number of pilot symbols to be added and an in-phase summing pattern. The frequency off set estimating section determines the predetermined interval and the predetermined pattern based on the addition count data and the in-phase summing pattern.

Also, the frequency off set estimating section may include an in-phase adding section, an addition synthesizing section and a frequency offset estimating unit. The in-phase adding section carries out the in-phase adding operations to the pilot symbols of the complex vector expression over the predetermined interval in accordance with the predetermined pattern. The addition synthesizing section carries out the complex adding operation of the results of the in-phase adding operations. The frequency offset estimating unit determines the frequency offset from the result of the complex adding operation.

In this case, the in-phase adding section includes a plurality of in-phase adding units, each of which may include a buffer memory, a control section and an in-phase adder. The buffer memory stores the pilot symbols of the complex vector expression. The control section generates the predetermined interval and the predetermined pattern based on an addition count data indicative of a number of pilot symbols to be added and an in-phase summing pattern. The in-phase adder reads out the pilot symbols of the complex vector expression from the buffer based on over the predetermined interval and the predetermined pattern, and carries out the in-phase adding operation to the read out pilot symbols of the complex vector expression.

Also, the addition synthesizing section may include a complex adder which carries out the complex adding operation of the results of the in-phase adding operations.

Also, the frequency offset estimating unit may include a buffer memory, a complex conjugate multiplier, an averaging unit, an angle converter and a converter. The buffer memory stores the result of the complex adding operation. The complex conjugate multiplier carries out a complex conjugate multiplication of the result of the complex adding operation stored in the buffer memory to calculate phase difference vectors. The averaging unit carries out an averaging operation to the phase difference vectors. The angle converter converts the averaged phase difference vector to an angle value. The converter converts the angle value to the frequency offset based on a symbol rate.

In another aspect of the present invention, a method of automatically controlling a frequency in a code division multiple access system, is attained by producing pilot symbols of complex vector expression from a received radio frequency (RF) signal based on a first local frequency signal and a second local frequency signal, wherein the first local frequency signal has a frequency obtained by shifting a frequency of a carrier signal by an IF frequency and the second local frequency signal has a frequency equal to the IF frequency, and the pilot symbols have been subjected to inverse modulation to remove a modulation component; by determining a frequency offset from the pilot symbols of the complex vector expression through in-phase adding operations to the pilot symbols of the complex vector expression over a predetermined interval based on a predetermined pattern; and by generating the first and second frequency signals based on the determined frequency offset.

Here, the predetermined interval may be an interval longer than one symbol period.

Also, when the producing includes: orthogonally demodulating the RF signal into an in-phase component and an orthogonal component; and producing a channel count data indicative of a number of effective channels from the in-phase component and the orthogonal component based on a spreading code, a symbol rate and a pilot symbol interval, the method may further include: generating the addition count data indicative of a number of pilot symbols to be added and an in-phase summing pattern. Thus, the determining a frequency offset is attained by determining the predetermined interval and the predetermined pattern based on the addition count data and the in-phase summing pattern.

Also, the producing may be attained by carrying out the in-phase adding operations to the pilot symbols of the complex vector expression over the predetermined interval in accordance with the predetermined pattern; by carrying out the complex adding operation of the results of the in-phase adding operations; and by determining the frequency offset from the result of the complex adding operation.

In this case, the carrying out the in-phase adding operations may be attained by storing the pilot symbols of the complex vector expression in a buffer memory for every in-phase adding operation; by generating the predetermined interval and the predetermined pattern based on an addition count data indicative of a number of pilot symbols to be added and an in-phase summing pattern; and by reading out the pilot symbols of the complex vector expression from the buffer based on over the predetermined interval and the predetermined pattern, to carry out the in-phase adding operation to the read out pilot symbols of the complex vector expression.

Also, the carrying out the complex adding operation may be attained by carrying out the complex adding operation of the results of the in-phase adding operations.

Also, the determining the frequency offset may be attained by storing the result of the complex adding operation in a buffer memory; by carrying out a complex conjugate multiplication of the result of the complex adding operation stored in the buffer memory to calculate phase difference vectors; by carrying out an averaging operation to the phase difference vectors; by converting the averaged phase difference vector to an angle value; and by converting the angle value to the frequency offset based on a symbol rate.

In order to achieve still another aspect of the present invention, an automatic frequency controlling method in a code division multiple access system using a spectrum spreading technique which has a frame format in which pilot symbols and data symbols are time multiplexed for transmission and in which a variable transmission symbol rate is realized by making a spreading rate variable under a constant chip rate, is attained by in-phase summing in at least two different in-phase summation rates the pilot symbols having a complex vector expression over a predetermined length of a symbol interval after converting the pilot symbols into the complex vector expression by canceling a data modulated component of the pilot symbols; and by estimating a frequency offset based on a result of complex conjugate multiplication of a plurality of the complex vector expressions which are subjected to the in-phase addition.

Also, the method may further include: controlling an oscillation frequency of a crystal oscillator in accordance with an estimation of the frequency offset calculated through the estimation of the frequency offset; converting the received frequency signal into an intermediate frequency signal in accordance with the oscillation frequency; and orthogonally demodulating the intermediate frequency signal based on the oscillation frequency.

Also, the automatic frequency controlling method may further include: obtaining a baseband signal having an in-phase component and an orthogonal component through the orthogonal modulation and converting into digital signals by A/D converters, respectively; inversely spreading the digital signals by inversely spreading units to separate the pilot symbols from the data symbols; and converting the pilot symbols into complex vector expressions by canceling the data modulated components of the pilot signals.

In order to achieve yet still another aspect of the present invention, an automatic frequency controlling system for demodulation in a code division multiple access system using a spectrum spreading technique which has a frame format in which pilot symbols and data symbols are time multiplexed for transmission and in which a variable transmission symbol rate is realized by making a spreading rate variable under a constant chip rate, includes:

an orthogonal demodulator converting a received signal into a baseband signal having an in-phase component and an orthogonal component; inversely spreading units for inversely spreading the in-phase component and the orthogonal component of the baseband signal; pilot symbol interval detectors separating the pilot symbols from the data symbols; inverse demodulating units for converting the pilot symbols into complex vector expressions by canceling data modulated components of the pilot symbols; an in-phase summing section in-phase summing in at least two different manners, the complex vector expressions of the pilot symbols over a predetermined length of the symbol section; and an estimating section estimating the frequency offset from complex conjugate multiplication of a plurality of the complex vector expressions which are subjected to the in-phase summation.

Also, the in-phase summing section in-phase summing in at least two different manners may include: a buffer memory for storing the symbols over at least two symbol intervals of the complex vector signal received from the demodulator; and an in-phase adder for in-phase summing the outputs of the buffer memory. Also, the estimating section estimating the frequency offset may include: a complex adder for summing the outputs of the in-phase adders which correspond to the in-phase components and the orthogonal components of the base band signal; a complex conjugate multiplier for storing the sum in a second buffer memory and carrying out complex conjugate multiplication to outputs of the second buffer memory; and an angle/frequency offset converter for averaging and converting outputs of the complex conjugate multiplier into angular components, and converting the angular components into frequency components to estimate a frequency offset.

Also, the automatic frequency controlling system may further include: a controlling section controlling the oscillation frequency of a crystal oscillator in accordance with an estimation of the frequency offset obtained through the estimation of the frequency offset; and a converting section converting the received frequency signal into an intermediate frequency signal in accordance with the oscillation frequency. At this time, the intermediate frequency signal is orthogonally demodulated using the oscillation frequency.

In order to another aspect of the present invention, a CDMA receiver in a code division multiple access system using a spectrum spreading technique which has a frame format in which pilot symbols and data symbols are time multiplexed for transmission and in which a variable transmission symbol rate is realized by making a spreading rate variable under a constant chip rate, includes: a mixer for converting a received frequency signal into an intermediate frequency signal; a first local frequency generator for supplying the mixer with a local oscillation signal; an orthogonal demodulator for orthogonally demodulating the intermediate frequency signal in accordance with a second local frequency of a second local frequency generator; inversely spreading units for converting in-phase components and orthogonal components of the baseband signal received from the orthogonal demodulator into analog/digital signals; pilot symbol demodulators for separating the inversely spread signal outputted from the inversely spreading units into pilot symbols and data symbols, and converting the pilot symbols into complex vector expressions by canceling the data modulated components of the pilot symbols; inversely demodulated pilot symbol in-phase adders for in-phase summing in at least two different manners, the complex vector expressions of the pilot symbols over a predetermined length of the symbol section; a frequency offset estimator for estimating the frequency offset based on complex conjugate multiplication of a plurality of the complex vector expressions which are subject to the in-phase summation; and a reference local frequency generator for generating a reference local frequency based on the frequency offset and delivering the reference local frequency to the first and second local frequency generators.

BRIEF DESCRIPTION OF THE DRAWINGS

FIGS. 2A to 2D are diagram showing a frame format employed even in the present invention;

DESCRIPTION OF THE PREFERRED EMBODIMENTS

Hereinafter, a receiver in a CDMA system of the present invention will be described below in detail with reference to the attached drawings.

Figure 5:
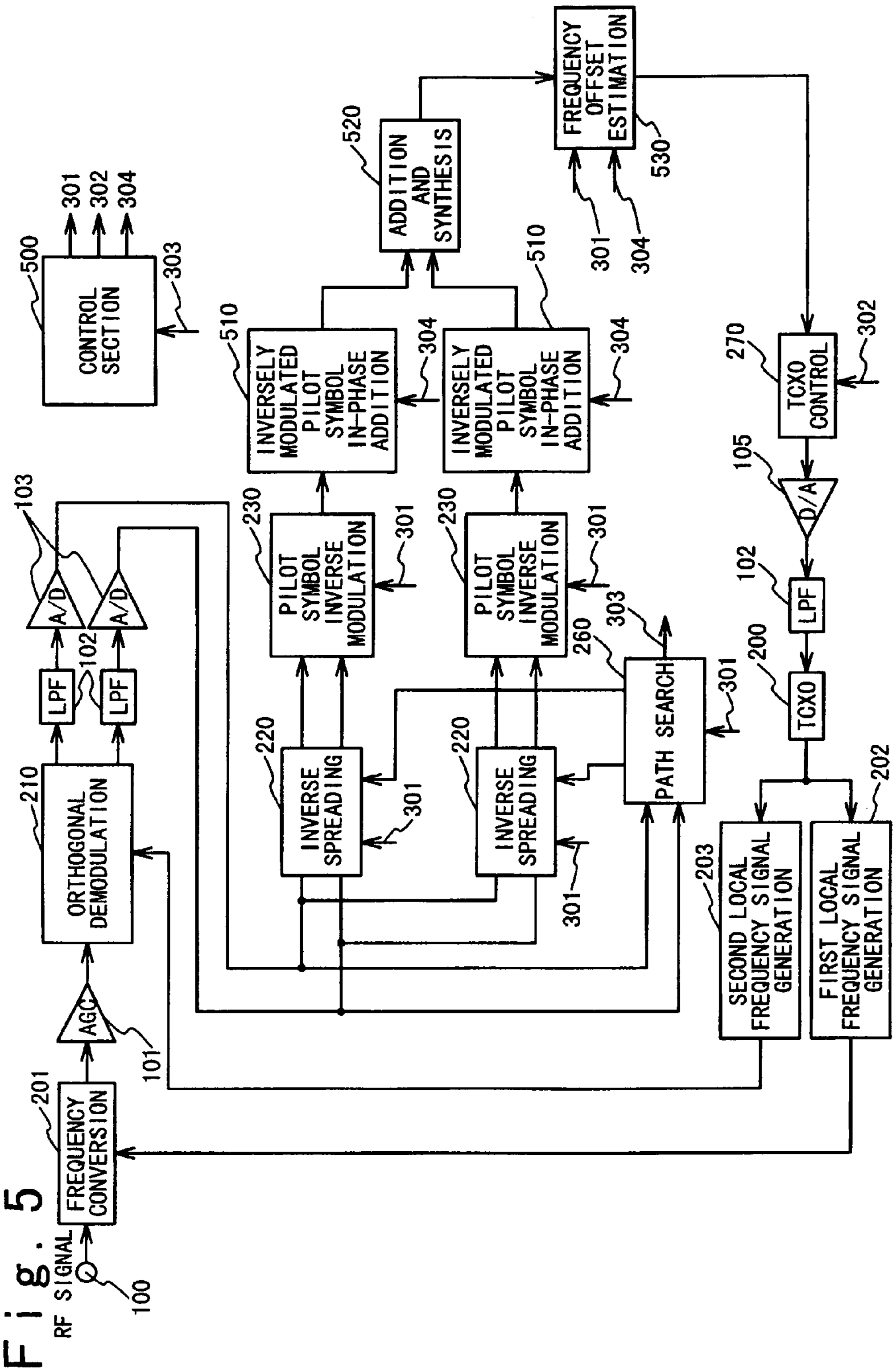
FIG. 5 is a block diagram of a receiver in a CDMA system according to an embodiment of the present invention.

FIG. 5 is a block diagram showing the structure of the receiver in the CDMA system according to an embodiment of the present invention. In this embodiment a structure relating to an inverse demodulation pilot symbol in-phase adders 510, an addition synthesizer 520, a frequency offset estimator 530, and a controller 500 is added or modified compared with the conventional system shown in FIG. 1. The other components are substantially identical to those of the conventional apparatus shown in FIG. 1. The blocks denoted by the same reference numerals as those shown in FIG. 1 are identical to those shown in FIG. 5 in the function and operation.

Figure 1:
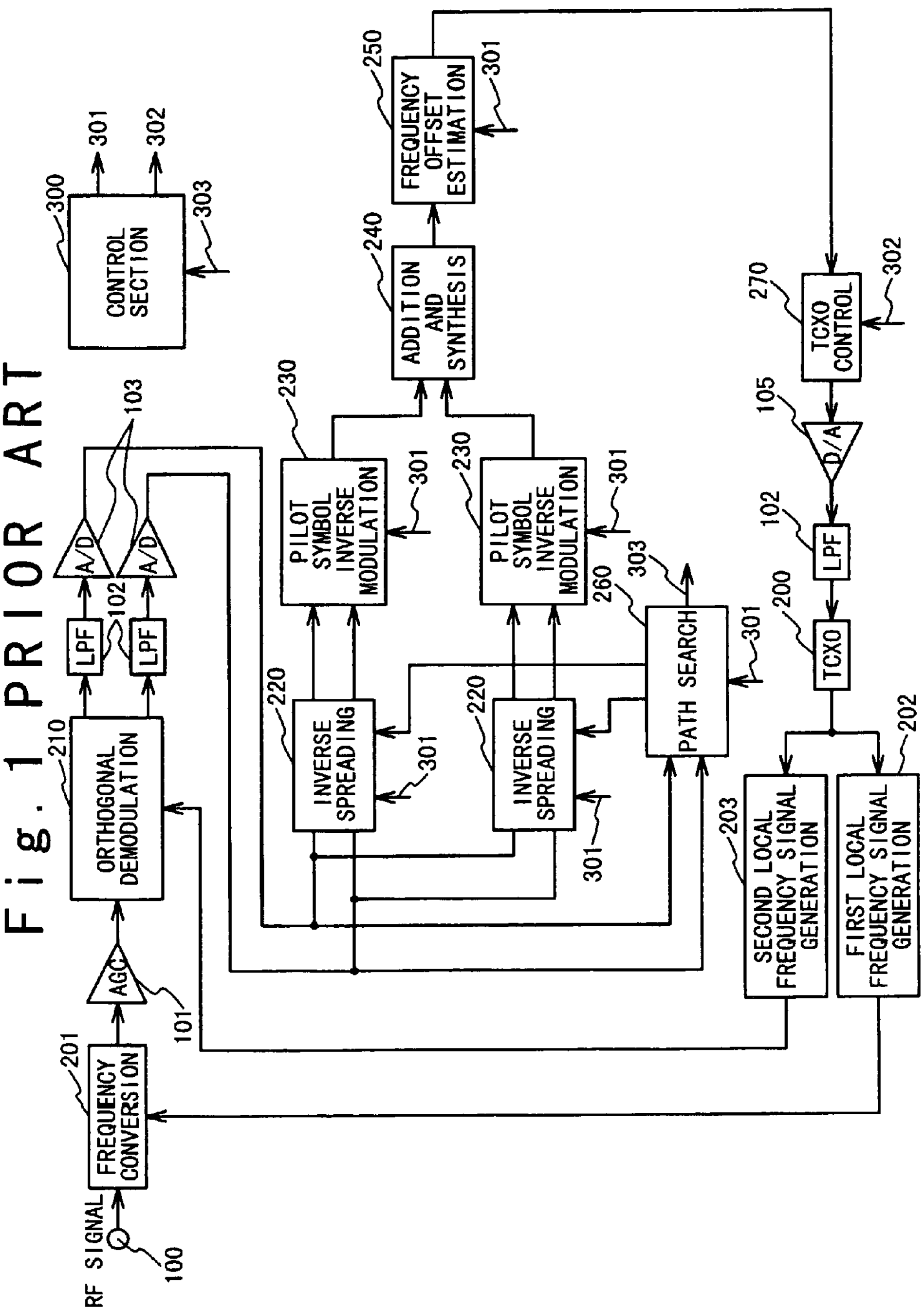
FIG. 1 is a block diagram showing a conventional automatic frequency controlling apparatus.
Figure 3A:
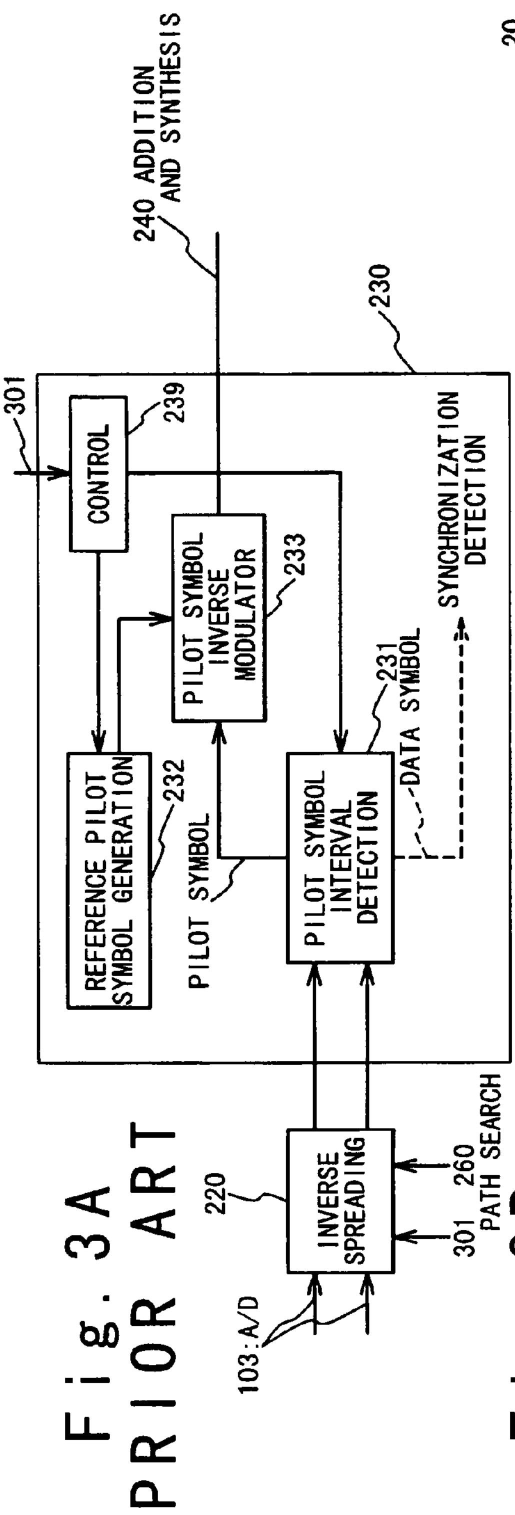
FIGS. 3A and 3B are a block diagram showing in more detail a pilot symbol inverse demodulator, an addition synthesizer, and a frequency offset estimator in the conventional apparatus of FIG. 1.
Figure 3B:
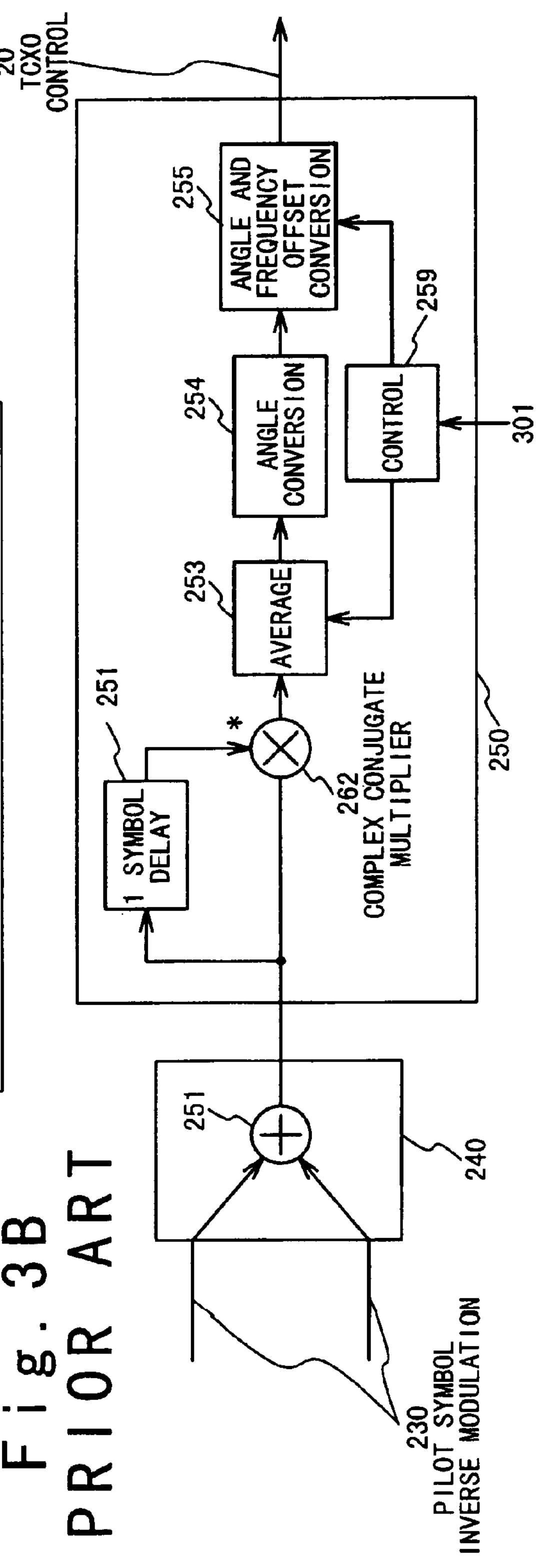
Figures 4A, 4B:
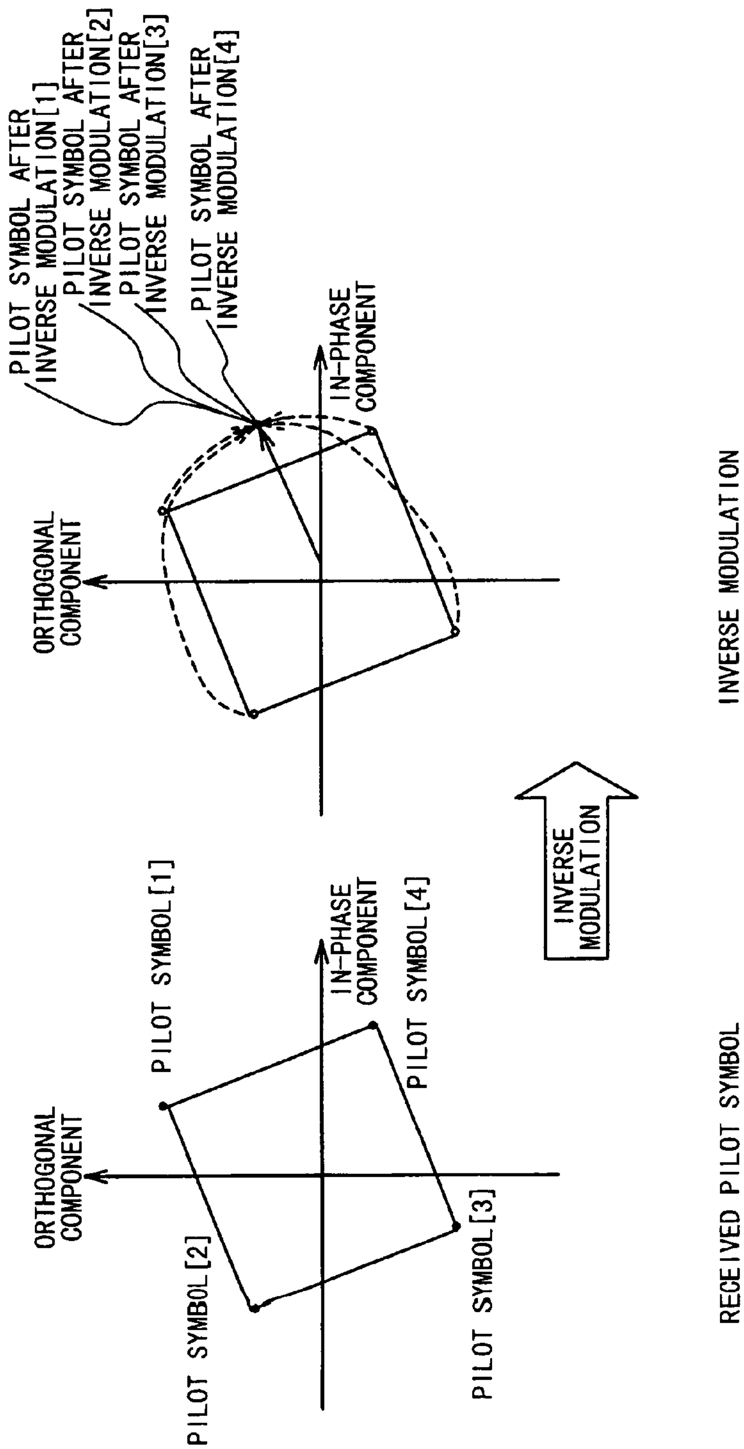
FIGS. 4A and 4B are diagrams showing in more detail an operation of the pilot symbol inverse demodulator of FIG. 1.

Referring to FIG. 1, an RF (radio frequency) signal, i.e., a high frequency signal from a transmitter received by an antenna is introduced to a frequency converter 201 via an input terminal 100. The frequency converter 201 receives a first local frequency signal from the first local frequency generator 202. A first local frequency signal is obtained by offsetting the frequency of a carrier signal from the transmitter by an IF frequency. The frequency converter 201 as a mixer converts the RF signal into an IF (intermediate frequency) signal in accordance with the first local frequency signal. The IF signal is then adjusted to a predetermined signal level by an AGC unit 101 and transferred to an orthogonal demodulator 210. A second local frequency signal having an IF frequency is supplied from a second local frequency generator 203 to an orthogonal demodulator 210. In response to the second local frequency signal, the orthogonal demodulator 210 converts the IF signal into a baseband signal which has a component I along an in-phase axis and a component Q along an orthogonal axis. It is now assumed that QPSK modulation is employed. The in-phase component and the orthogonal component of the orthogonally demodulated signal are passed through two LPF units 202, respectively, and fed to A/D converters 103 which converts into their digital signals. Then, the converted digital signals are transferred to inversely spreading units 220 and a path searching unit 260. The path searching unit 260 determines a delay profile from the digital signals supplied from the A/D converters 103 to determine the timing for inverse spreading used in the inversely spreading units 220. The intervals for which the delay profile is calculated and the averaged length of the intervals are determined based on an instruction 301 from the controller 300. The path searching unit 260 outputs an inverse spreading timing to the inversely spreading units 220 based on the determined delay profile. Also, the path searching unit 260 determines how many effective multi-paths are present in the received digital signals and delivers its result 303 to the controller 300.

The inversely spreading units 220 receives a control signal 301 from the controller 300. The control signal 301 includes parameter data 301 such as a spreading code and symbol rate of the channel and boundary data of a pilot symbol interval. The inversely spreading units 220 inversely spread the digital signals received from the A/D converters 103 into symbol signals based on the inverse spreading timing received from the path searching unit 260 and the control signal 301. The symbol signals are transferred to pilot symbol inverse demodulators 230. In this conventional example, it is assumed that a pilot symbol signal and a data symbol signal are time-multiplexed in the symbol signal to have a QPSK transmission format, as illustrated in FIG. 2A. A pilot symbol interval is inserted before a data symbol interval for every slot period having a predetermined interval called "a slot". A pilot symbol pattern in the pilot symbol interval in each slot period is variable. In this case, the symbol rate can be made variable by changing the spreading rate under a constant chip rate as shown in FIG. 2D. More specifically, the symbol interval in the symbol rate of 2*Fs is decreased to a half of the symbol interval in the symbol rate of Fs, as shown in FIGS. 2B and 2C.

It should be noted that the pilot symbol interval remains unchanged in the length when the symbol rate is varied in FIGS. 2B and 2C. However, there generally is no such a limitation. The pilot symbol interval length may be varied depending on the symbol rate Fs.

The controller 500 shown in FIG. 5 receives the number of effective paths 303 from the path searching unit 260. The controller 500 generates a reception channel data such as the spreading code, the symbol rate, and the number of pilot symbols or pilot symbol interval. Also, the controller 500 generates various parameters for frequency offset estimation such as the number of data for phase difference average summation and angle/frequency offset conversion factors. In addition, the controller 500 generates temperature compensated crystal oscillator (TCXO) control data such as a conversion table between frequency offset and TCXO control voltage and the validation or invalidation of an updating operation of frequency offset. In this case, the controller 500 supplies the reception channel data by the control signal 301 to the path searching unit 260, the inverse spreading units 220, the pilot symbol inverse modulators 230 and a frequency offset estimator 530. Also, the controller 500 supplies the parameters for frequency offset estimation and a part of the TCXO control data such as the validation or invalidation of the updating operation of frequency offset to an inverse modulation pilot symbol in-phase adders 510 and the frequency offset estimator 530 by a control signal 304. The controller 500 supplies a value of the conversion table between frequency offset and TCXO control voltage to the TCXO controller 270 by a control signal 502.

Figure 6:
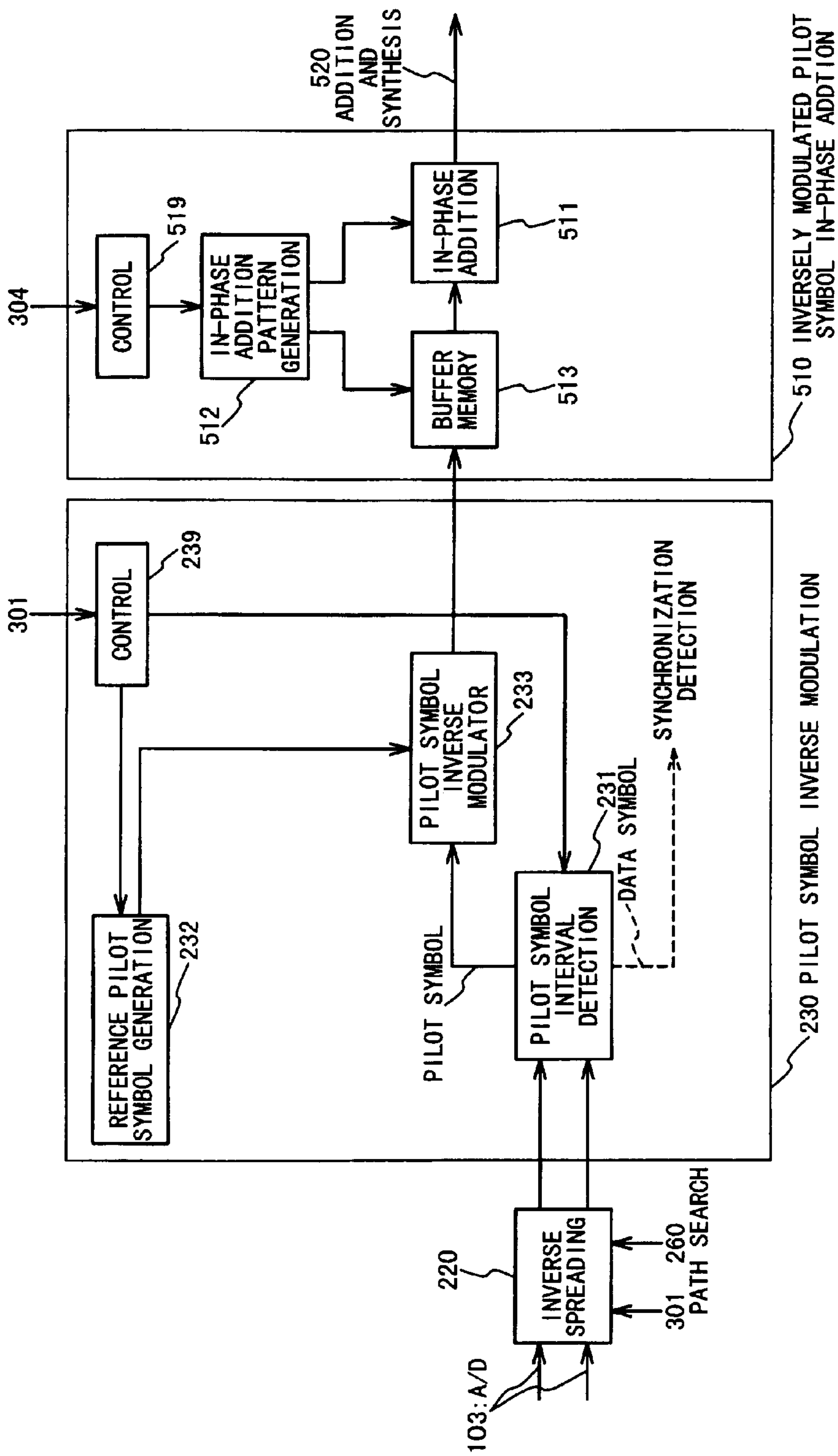
FIG. 6 is a block diagram showing in more detail a pilot symbol inverse demodulator and an inversely demodulated pilot symbol in-phase adder in the apparatus of FIG. 5.

FIG. 6 illustrates the structure of the pilot symbol inverse demodulator 230 and the inversely demodulated pilot symbol in-phase adder 510. In the pilot symbol inverse demodulator 230, a controller 239 generates a generation control signal to the reference pilot symbol generator 232 in response to the control signal 301 from the controller 500. The reference pilot symbol generator 232 generates a pilot symbol pattern for a symbol rate and a concerned slot in response to the generation control signal to output to a pilot symbol inverse demodulator 233. The pilot symbol pattern for the symbol rate and the concerned slot necessary for the inverse demodulation. Thus, the length of the pilot symbol interval is determined based on the control signal 301. The QPSK symbol signal received from the inversely spreading unit 220 is separated by a pilot symbol interval detector 231 into pilot symbols in the pilot symbol interval and data symbols in the data symbol interval based on a control signal form the controller 239. The length of the pilot symbol interval is determined based on designation through the control signal 301 from the controller 500. The pilot symbols are delivered to a pilot symbol inverse demodulator 230. The data symbol is subjected to synchronization detection for demodulate the data received from the transmitter. The pilot symbol inverse demodulator 233 receives the pilot symbol pattern from the reference pilot symbol generator 232 and cancels or removes a modulated component of the pilot symbol signal received from the pilot symbol interval detector 231 for demodulation to produce an inversely modulated pilot symbol signal. The inversely demodulated pilot symbol signals are then transferred to an inversely modulated pilot symbol in-phase adder 510. The inversely demodulated pilot symbol signals are outputted to the inversely modulated pilot symbol in-phase adder 510 in the form of a complex vector.

In the inversely modulated pilot symbol in-phase adder 510, a controller 519 receives an in-phase summing pattern and the number of symbols to be in-phase summed through the control signal 304 from the controller 500. Also, the controller 519 instructs an in-phase summing pattern generator circuit 512 to control the operation of the buffer memory 513 and the in-phase adder circuit 511. The inversely demodulated pilot symbol signals from the pilot symbol inverse demodulator 230 are expressed in the form of a complex vector in units of symbols. The inversely demodulated pilot symbol signals are outputted to a buffer memory 513 in the inversely demodulated pilot symbol in-phase adder 510 and stored therein. A part of the complex vectors expressing the inversely demodulated pilot symbol signals is read out from the buffer memory 513. Then, the read out complex vectors are in-phase summed by an in-phase adder 511 based on a control signal by the controller 519 which operates in response to the control signal 304 from the controller 500. The result of the in-phase summation is delivered to an addition synthesizer 520.

Figure 7:
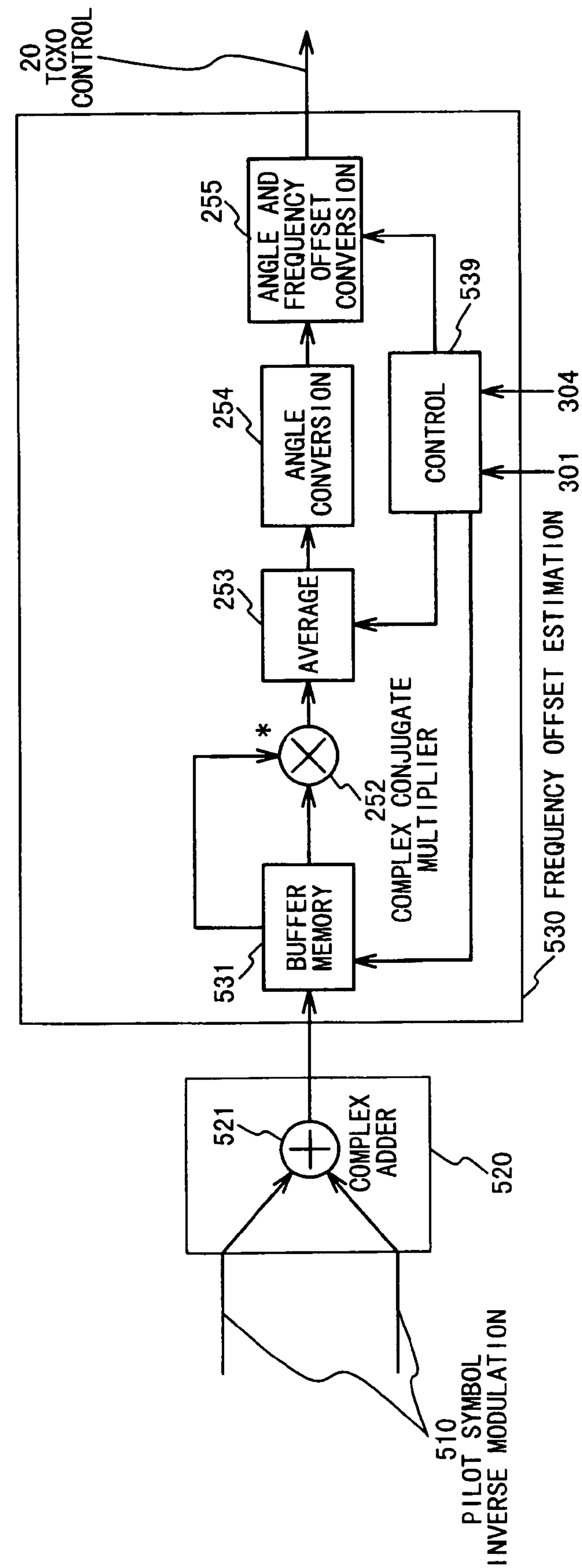
FIG. 7 is a block diagram showing in more detail an addition synthesizer and a frequency offset estimator in the apparatus of FIG. 5.

As shown in FIG. 7, in the addition synthesizer 520, a complex adder 521 carries out a complex adding operation to the in-phase added inversely modulated pilot symbol signals supplied from the inversely modulated pilot symbol in-phase adders 51. Then, the complex adder 521 outputs the result of the complex addition to the frequency offset estimator 530. The output of the addition synthesizer 240 is expressed as complex vectors.

In the frequency offset estimator 530, the controller 539 controls a buffer memory 531, a averaging unit 253, and a angle/frequency offset converter 255 based on the symbol rate supplied through the control signal 301 from the controller 500 and the number of complex adding results for phase difference to be averaged, the angle/frequency offset conversion factor, and the validation or invalidation of the updating operation of the frequency offset supplied through the control signal 304 from the controller 500. For example, the controller 539 supplies the angle/frequency offset converter 255 with the symbol rate necessary for estimating the frequency offset. Also, the controller 539 controls the averaging unit 253 to carry out the averaging operation of the phase difference vectors supplied from the complex conjugate multiplier 252 for the number of complex adding results for the phase difference supplied through the control signal 304. The averaging operation may be a simple summation averaging operation, a moving averaging operation, or a leak factor based averaging operation. Further, the controller 539 supplies the angle/frequency offset converter 255 with the symbol rate of the concerned channel supplied through the control signal 301 for conversion of the angular data per symbol into a frequency offset per the symbol rate. Also, the controller 539 has a function to retrain the output of the angle/frequency offset converter 255 based on the validation or invalidation of the updating operation of the frequency offset supplied through the control signal 304.

When the path searching unit 260 finds no effective path, the fact of no effective path is informed by a signal 303 from path searching unit 260 to the controller 500. The controller 500 then delivers the controls signals 301 and 304 to the controller 539 such that the averaging operation of the averaging unit 253 is stopped in response to the control by the controller 539. The controller 539 determines whether the averaging operation is to be carried out and which type of the averaging operation is carried out in the averaging unit 253.

The phase difference vector averaged by the averaging unit 253 is outputted to an angular converter 254 where the phase difference vector expression is converted into an angular expression. The conversion from the phase difference vector to the angle can be implemented by use of arc tangent conversion (arch tan (imaginary part/real part)) of an imaginary part and a real part of the phase difference vector. The angular expression is converted into a frequency offset expression by the angle/frequency offset converter 255 based on the symbol rate over the channel instructed from the controller 539. The frequency offset converted by the angle/frequency offset converter 255 is then outputted to a TCXO controller 270.

It should be noted that when no effective path is found by the path searching unit 260, the transfer of the frequency offset expression to the TCXO controller 270 is stopped. In response to the control signals 301 and 304 of the controller 500, the controller 539 supplies the averaging unit 253 with instructions of the number of vectors to be averaged and the validation or invalidation of the averaging operation and the angle/frequency offset converter 255 with the symbol rate data, the in-phase summing pattern, and the validation or invalidation of the frequency offset output.

Figures 8A, 8B, 8C, 8D, 8E:
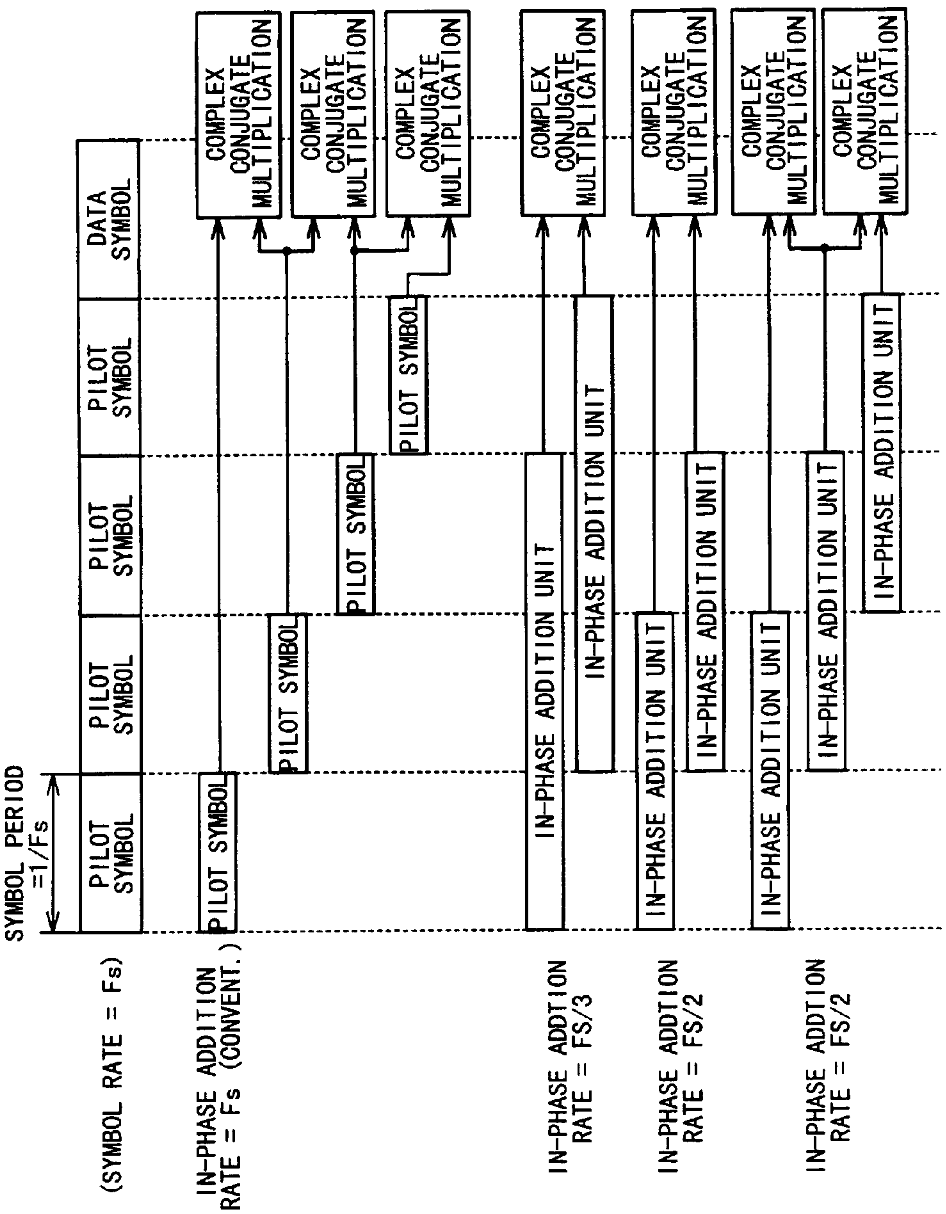
FIGS. 8A to 8E are diagrams showing in more detail an in-phase summing process in FIG. 6 according to the present invention.

The in-phase adder 511 will be now described in more detail with reference to FIGS. 8A to 8E. As shown in FIG. 8A, the symbol rate over the channel is supposed to be Fs. It is also assumed that the rectangular box denoted by "pilot symbol" in FIG. 8A is a complex vector received from the pilot symbol inversely demodulating unit 233.

As shown in FIG. 8B, in the conventional method, complex conjugate multiplication is carried out to the complex vectors for every symbol rate Fs. In this case, complex conjugate multiplication is carried out to the complex vectors for every symbol period (1/Fs). On the other hand, according to the present invention, the complex vectors received from the pilot symbol inversely demodulating unit 233 are in-phase summed over an interval longer than one symbol period for the symbol rate. For example, as shown in FIG. 8C, an in-phase addition unit is composed of three pilot symbol intervals for three symbol periods (3/Fs) and the complex vectors for three pilot symbol are in-phase added. Similarly, FIGS. 8D and 8E illustrate that the complex vectors in two symbol periods (2/Fs) corresponding to two pilot symbol intervals are in-phase added. In this way, the complex vectors are in-phase added over an interval longer than the symbol periods. The in-phase addition result is used to calculate complex conjugate multiplication for determining the frequency offset. Therefore, the S/N ratio of the complex vector can significantly be improved.

Assuming that the variance of noises contained in the complex vector is $\sigma^2$, the variance contained in the complex conjugate multiplication is $\sigma^4$ which is second power of $\sigma^2$. In this case, the variance of the noise is $2\times\sigma^4\div3$ when the results of the complex conjugate multiplication shown in FIG. 8B are averaged. On the other hand, the variance contained therein is $\sigma^2/2$ when the complex conjugate multiplication is carried out using the structure shown in FIG. 8C, and the variance is much smaller. Therefore, in the system in which a phase difference between the complex vectors is calculated using the complex conjugate multiplication, it is necessary to improve the S/N ratio in the complex vector in order to increase the accuracy of estimation of the frequency offset. The embodiment of the present invention is advantageous over the conventional method in this aspect.

The in-phase summing pattern generator 512 has a function to receive the in-phase summing pattern and the number of symbols to be in-phase summed from the adder controller 519. Also, the in-phase summing pattern generator 512 has a function to control the in-phase adder 511 and the buffer memory 513 to carry out the in-phase summation shown in any of FIGS. 8C to 8E. More particularly, the in-phase summing pattern generator 512 operates in response to the instruction from the controller 519 which has received the control signal 304 from the controller 500. The complex vectors stored in the buffer memory 531 in the frequency offset estimator 530 are outputted to a complex conjugate multiplier 252 in response to an instruction from the controller 539 as shown in FIGS. 8C to 8E. The complex conjugate multiplier 252 calculates the phase difference vectors to output to an averaging unit 253.

It should be noted that the adjacent complex vectors are selected and used for calculating a phase difference vector as shown in FIGS. 8A to 8E. However, the complex vectors are not limited to them. For example, consider a case that there are eight pilot symbols in FIGS. 8A to 8E and the in-phase summation unit is over five symbol intervals in FIG. 8C. In this case, the number of sets of complex vectors to be used for complex conjugate multiplication is four. Accordingly, it may be possible to carry out complex conjugate multiplication to the first complex vector and the fourth complex vector for calculating a phase difference vector. However, it is necessary to divide the angular data by three, when the frequency offset per symbol is calculated in an angle/frequency offset converter 255. In this embodiment, the "three" is termed an angle/frequency offset conversion factor. This control is carried out by the controller 539.

The TCXO controller 270 determines the voltage applied to a TCXO unit 200 according to the frequency offset received from the frequency offset estimator 250. More particularly, the control voltage corresponding to the frequency offset is determined using the table supplied through the control signal 302 from the controller 500. At this time, the TCXO control voltage is selected to have such a value that the frequency offset is compensated. The control voltage determined by the TCXO controller 270 is a digital value and hence is converted to an analog value by a D/A converter 105 and then is transmitted via an LPF 102 to the TCXO unit 200.

The first local frequency generator 202 and the second local frequency generator 203 receive a reference local frequency signal from the TCXO 200 with a temperature compensating circuit. The first local frequency generator 202 generates the first local frequency signal which is generated by shifting the frequency of the carrier signal received from the transmitter by the IF frequency. The second local frequency generator 203 generates the second local frequency signal which has the IF frequency.

In the embodiment of the present invention, the number of pilots symbols to be in-phase summed for calculating the frequency offset is calculated over an interval longer than the symbol interval. However, if desired, the number of the symbol intervals to be summed may be one. For example, when the symbol rate is significantly small, the frequency offset may be determined using only the pilot symbols as in the conventional method. Such control is carried out by the controller 500 shown in FIG. 5.

It should be noted that a case where only two inversely spreading units are provided is described in the above embodiment. However, three or more inversely spreading units may be used. In this case, it is preferable that the inverse spreading signal for multiplication can be selected more accurate and faster in the inverse spreading operation corresponding to the path searching operation. Also, in this case, three or more pilot symbol inverse demodulators and the inversely demodulated pilot symbol in-phase adders are provided for the three or more inversely spreading units. As the result of the addition by the addition synthesizer, the frequency offset can be calculated at a higher accuracy. Accordingly, the frequency offset in the TXCO unit can precisely be corrected, hence carrying out accurate data demodulation.

As set forth above, according to the present invention, in the CDMA system having a frame format in which pilot symbols and data symbols are time multiplexed and transmitted, and a spreading rate which is made variable under a constant chip rate, to realize the variable transmission symbol rate, the pilot symbols are in-phase summed over an interval longer than symbol periods on the channel so that the S/N ratio in the complex vector used for calculating a frequency phase difference can be improved, resulting in providing an automatic frequency controlling apparatus which can carry out more accurate the estimation of the frequency offset than the conventional method.

What is claimed is:

1. An automatic frequency controlling method for controlling an oscillation frequency in a code division multiple access system using a spectrum spreading technique which has a frame format in which pilot symbols and data symbols are time multiplexed for transmission and in which a variable transmission symbol rate is realized by making a spreading rate variable under a constant chip rate, said method comprising:

in-phase summing in at least two different in-phase summation rates the pilot symbols each having a complex vector expression over a predetermined length of a symbol interval after converting the pilot symbols into respective complex vector expressions by canceling data modulated components of the pilot symbols;

estimating a frequency offset based on a result of conjugate complex multiplication of a plurality of said complex vector expressions which are subjected to the in-phase summing; and controlling the oscillation frequency of a crystal oscillator in accordance with an estimation of the frequency offset calculated through the estimating of the frequency offset.

2. An automatic frequency controlling method according to claim 1, said method further comprising:

converting a received frequency signal into an intermediate frequency signal in accordance with the oscillation frequency; and orthogonally demodulating the intermediate frequency signal based on the oscillation frequency.

3. An automatic frequency controlling method according to claim 1, said method further comprising:

obtaining a baseband signal having an in-phase component and an orthogonal component through the orthogonal demodulation and converting into digital signals by A/D converters, respectively;

inversely spreading the digital signals by inversely spreading units to separate the pilot symbols from the data symbols; and converting the pilot symbols into the respective complex vector expressions by canceling the data modulated components of the pilot symbols.

4. An automatic frequency controlling system for controlling an oscillation frequency in a code division multiple access system using a spectrum spreading technique which has a frame format in which pilot symbols and data symbols are time multiplexed for transmission and in which a variable transmission symbol rate is realized by making a spreading rate variable under a constant chip rate, comprising:

an orthogonal demodulator converting a receive signal into a baseband signal having an in-phase component and an orthogonal component;

inversely spreading units inversely spreading the in-phase component and the orthogonal component of the baseband signal;

pilot symbol interval detectors detecting the pilot symbols from the data symbols;

pilot inverse modulating units converting the pilot symbols into complex vector expressions by canceling data modulated components of the pilot symbols;

an in-phase summing section in-phase summing in at least two different in-phase summation rates, the complex vector expressions of the pilot symbols over a predetermined length of a symbol section;

an estimating section estimating a frequency offset from conjugate complex multiplication of a plurality of said complex vector expressions which are subjected to the in-phase summation; and a controlling section controlling the oscillation frequency of a crystal oscillator in accordance with an estimation of the frequency offset obtained through the estimation of the frequency offset.

5. An automatic frequency controlling system according to claim 4, wherein:

(a) the in-phase summing section in-phase summing in the at least two different in-phase summation rates comprises:

a buffer memory storing the pilot symbols over at least two symbol intervals of the complex vector expressions received from the inverse modulating units; and an in-phase adder in-phase summing the outputs of the buffer memory, (b) the system further comprises a complex adder summing outputs of the in-phase adder which correspond to the in-phase components and the orthogonal components of the base band signal, and (c) the estimating section estimating the frequency offset comprises:

a conjugate complex multiplier carrying out conjugate complex multiplication of a sum stored in a second buffer memory to outputs of the second buffer memory; and an angle and frequency offset converter averaging and converting outputs of the conjugate complex multiplier into angular components, and converting the angular components into frequency components to estimate the frequency offset.

6. An automatic frequency controlling system according to claim 4, further comprising:

a converting section converting the received signal into an intermediate frequency signal in accordance with the oscillation frequency, wherein the intermediate frequency signal is orthogonally demodulated using the oscillation frequency.

7. A CDMA receiver in a code division multiple access system using a spectrum spreading technique which has a frame format in which pilot symbols and data symbols are time multiplexed for transmission an in which a variable transmission symbol rate is realized by making a spreading rate variable under a constant chip rate, comprising:

a mixer for converting a received frequency signal into an intermediate frequency signal;

a first local frequency generator supplying the mixer with a local oscillation signal;

an orthogonal demodulator for orthogonally demodulating the intermediate frequency signal in accordance with a second local frequency of a second local frequency generator;

inversely spreading units converting in-phase components and orthogonal components of the baseband signal received from the orthogonal demodulator into digital signals;

pilot symbol demodulators separating the inversely spread signal outputted from the inversely spreading units into the pilot symbols and the data symbols, and converting the pilot symbols into complex vector expressions by canceling the data modulated component of the pilot symbols;

inversely modulated pilot symbol in-phase adders for in-phase summing in at least two different in-phase summation rates, the complex vector expressions of the pilot symbols over a predetermined length of a symbol section;

a frequency offset estimator estimating a frequency offset based on conjugate complex multiplication of a plurality of said complex vector expressions which are subject to the in-phase summing; and a reference local frequency generator generating a reference local frequency based on the frequency offset and delivering the reference local frequency to the first and second local frequency generators.

* * * * *